US006983240B2

(12) United States Patent
Ait-Mokhtar et al.

(10) Patent No.: US 6,983,240 B2
(45) Date of Patent: Jan. 3, 2006

(54) METHOD AND APPARATUS FOR GENERATING NORMALIZED REPRESENTATIONS OF STRINGS

(75) Inventors: Salah Ait-Mokhtar, Grenoble (FR); Jean-Pierre Chanod, Grenoble (FR); Eric Gaussier, Eybens (FR)

(73) Assignee: Xerox Corporation, Stamford, CT (US)

( * ) Notice: Subject to any disclaimer, the term of this patent is extended or adjusted under 35 U.S.C. 154(b) by 935 days.

(21) Appl. No.: 09/738,319

(22) Filed: Dec. 18, 2000

(65) Prior Publication Data

US 2002/0116169 A1    Aug. 22, 2002

(51) Int. Cl.
G06F 17/27    (2006.01)
G06F 7/00    (2006.01)
G06F 12/00    (2006.01)

(52) U.S. Cl. .................................. 704/9; 707/1; 711/1
(58) Field of Classification Search .................... 711/1; 707/1; 704/9
See application file for complete search history.

(56) References Cited

U.S. PATENT DOCUMENTS 5,796,926 A  *  8/1998  Huffman ...................... 706/45
6,006,221 A  *  12/1999  Liddy et al. .................. 707/5
6,131,082 A  *  10/2000  Hargrave et al. ............. 704/7
6,202,064 B1 *  3/2001  Julliard ......................... 707/5

FOREIGN PATENT DOCUMENTS

EP    1 111 514 A1    6/2000

OTHER PUBLICATIONS

Collins, Micheal, "Discriminative Reranking for Natrual Language Parsing," Jul. 2000, Proc. 17th International Conf. on Machine Learning, pp. 175-182.*
Tucker, Jr., Allen. "A Perspective on Machine Translation: Theory and Practice," Apr. 1984, Communications of the ACM, pp. 322-329.*
J.-M. Langé, E. Gaussier, B. Daille, "Bricks and Skeletons: Some Ideas for the Near Future of MAHT", Machine Translation, vol. 12, #1-2, 1997.
Emmanuel Planas, Osamu Furuse, "Formalizing Translation Memories", MT Summit VII, Sep. 1999, pp. 331-339 Singapour.
M. Nagao, "A Framework of Mechanical Translation between Japanese and English by Analogy Principle", in Artificial and Human Intelligence. Elsevier, 1984.

* cited by examiner

Primary Examiner—Richemond Dorvil
Assistant Examiner—V. Paul Harper
(74) Attorney, Agent, or Firm—Oliff & Berridge, PLC (57) ABSTRACT

A method generates normalized representations of strings, in particular sentences. The method, which can be used for translation, receives an input string. The input string is subjected to a first operation out of a plurality of operating functions for linguistically processing the input string to generate a first normalized representation of the input string that includes linguistic information. The first normalized representation is then subjected to a second operation for replacing linguistic information in the first normalized representation by abstract variables and to generate a second normalized representation.

19 Claims, 5 Drawing Sheets

METHOD AND APPARATUS FOR GENERATING NORMALIZED REPRESENTATIONS OF STRINGS

BACKGROUND OF THE INVENTION

1. Field of the Invention

The invention generally relates to a method and apparatus for generating normalized representations of strings, e.g. sentences, and in particular to a method for providing translation information for translating a string from a first language to a second language.

2. Description of the Related Art

A plurality of applications make use of normalized representations of strings, e.g. sentences, in particular applications in the area of translation memory, authoring memory, bilingual authoring memory, indexing, etc. An important application of normalized representations is translation memories in translation systems. These translation memories store linguistically-based normalized representations of text. Translation memory repositories collect segments of texts such as sentences or technical terms associated with a translation into some target languages. Such repositories give human translators an immediate access to translations that have been previously recorded. This reduces the effort, time and costs of translations, while improving its consistency.

The capability of translation memories can be expanded through fuzzy matching, a technique that matches input segments yet to be translated with segments stored in the translation memory, even if they are not identical to the input segments. Typical measures to allow fuzzy matching during the matching process may be ignoring a predefined set of words such as articles, conjunctions, etc or ignoring a set of predefined symbols, in particular punctuation marks. Furthermore, upper case and lower case characters or specific expressions such as numerical expressions may be normalized. During a matching step of a retrieving processing string segments (as ordered sequences of characters) may be used regardless of their linguistic structure and a mismatch of a certain number of characters may be allowed.

Retrieval systems serve to retrieve those texts or text portions that are relevant to the information needs of a user. In general, the relevant information contained in texts is constructed and extracted according to a normalized representation. Such a representation is abstracted away from its original linguistic form. Database queries of a user are generally subjected to processing in order to expand the scope of the query and/or to interpret the query syntax. The extracted query information is then matched against the stored representations in order to retrieve the specific information contained in a text. That or those text units which are the most similar to a query are output as retrieved text units.

For evaluating retrieval performance of information retrieval systems, two criteria are used, namely the "calling rate" and the "precision" these criteria are based on the subjective point of view on the relevance of retrieved information. The "calling rate" or "recall" and the precision are defined as follows.

The recall is a ratio of a number of relevant retrieved text units to the total number of relevant text units stored in the database, the precision is a ratio of a number of relevant text units to the number of retrieved text units. There is usually a trade-off between these two criteria. In information retrieval, it is desirable that these two criteria are in proximity to the maximum value of one.

SUMMARY OF THE INVENTION

The present invention has been made in consideration of the above situation, and it has as its primary object to provide a method and apparatus for generating normalized representations of strings.

It is another object of the present invention to provide a method and an apparatus that increase the proportion of relevant text units retrieved from a database.

It is still another object of the present invention to provide a method and an apparatus that retrieve information from a database with a higher precision.

It is yet another object of the invention to provide a method and an apparatus for generating normalized representations which may be stored in a database wherein the normalized representations increase the retrieval performance of information retrieval systems.

It is another object to provide a translation memory for translation systems having an increased retrieval performance of translation information.

Still another object of the present invention is to provide a method for providing translation information with improved retrieval performance from previously translated text units.

These and other objects of the present invention will become apparent hereinafter.

To achieve these objects, the present invention provides a method, and apparatus therefor, for normalizing input strings. The method includes receiving the input strings for linguistic analysis, which includes morphological, syntactic and semantic analysis, to generate a first representation of each of the input strings. Each of the first representations includes linguistic information that relates, for example, signs such as sounds and words to their meaning and vice versa. Each of the first representations is skeletised to generate a corresponding second representation for each of the input strings. The skeletising replaces the linguistic information with abstract variables in each of the second representations. The second representation are then stored as normalized representations of the input strings.

According to another aspect of the invention, there is provided a retrieval method for retrieving strings from a database. The database comprises normalized representations of a plurality of strings. The retrieval method comprises the steps of receiving a query, generating a normalized representation of the query, matching the normalized representation of the query to the normalized representations stored in the database and outputting the most similar string retrieved from the database.

According to a further aspect, there is provided a method for providing translation information for translating a string of a first language to a second language. The translation information is based on a plurality of normalized representations of strings in the first language and corresponding strings previously translated to the second language. The method for providing translation information comprising the steps of receiving an input string in the first language, retrieving a similar string in the first language from the plurality of normalized representations and outputting the translation information based on a string in the second language which corresponds to the retrieved string in the first language.

In preferred embodiments, further improvements can be achieved by applying additional processing steps to the processing sequence, either by providing at least an operation out of the plurality of operating functions extracting linguistic information or by operating functions generalizing extracted linguistic information.

The invention has its primary applications in indexing, information retrieval, translation memory, authoring memory and machine edited human translation.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings wherein.

DETAILED DESCRIPTION

The illustrated embodiments of the present invention will now be described with reference to the figure drawings.

Figure 1:
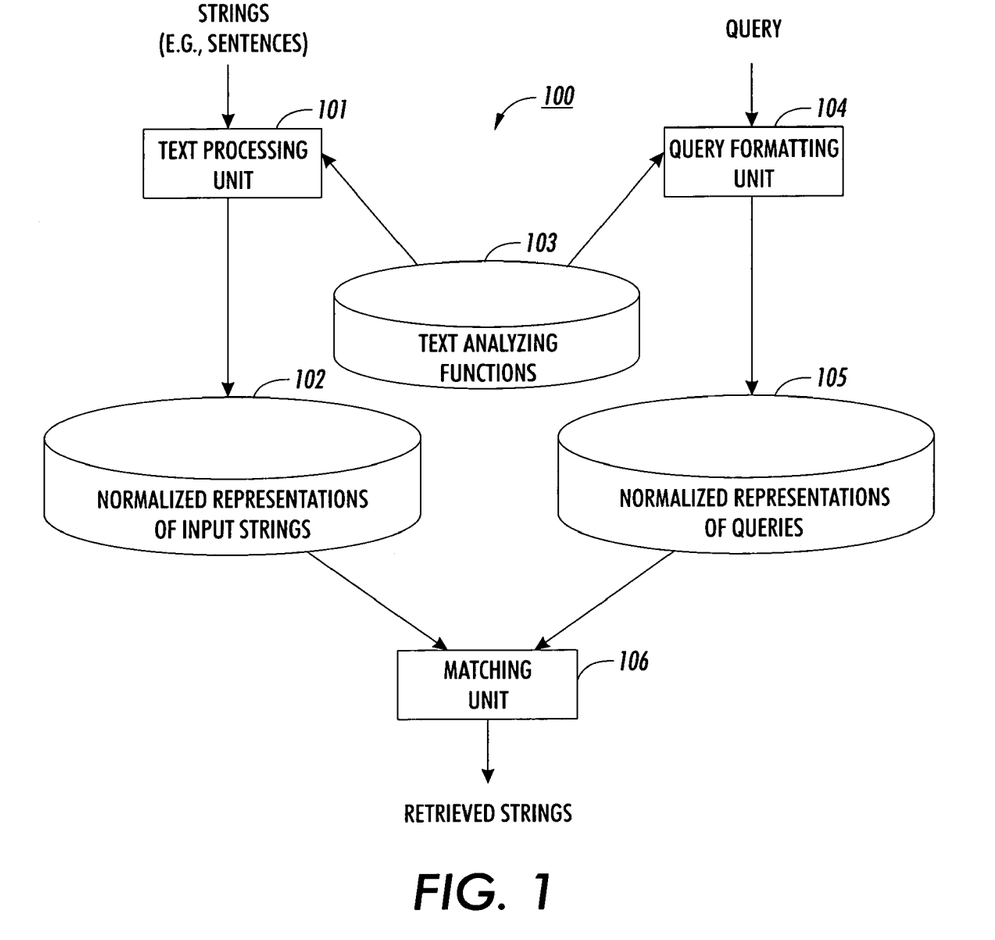
FIG. 1 illustrates a schematic diagram of a configuration of an information retrieval system.

Referring now to the drawings and particularly FIG. 1, which illustrates a preferred embodiment of an information retrieval system 100. Such an information retrieval system might be a method for providing translation information. In the retrieval system, there is provided a "storage line" including a text-processing unit 101 and a unit 102 for storing normalized representations of text units which are received from processing unit 101. Such a unit 102 might be a text unit database, in particular a translation memory in a translation system as a foreign language aid.

Many databases use indexes for the most frequently requested information contained therein. In other words, each field of information for each record in the database is indexed. An index can be described as a list of distinct attribute record values associated with pointers. By indexing individual fields of a database, queries on index fields enjoy a fast response time. In a preferred embodiment, the processing unit 101 creates normalized representations of a plurality of text units as indexes for these text units.

The processing of input strings or text units in unit 101 is based on a plurality of text analyzing functions. The present invention proposes a representation scheme for storing, matching, retrieving text units. A sequence of processes is used to produce various representations. The present invention uses natural language processing capabilities such as part-off-speech tagging, lemmatization and syntactic or semantic notations, skeletisation and any combination of such means. Normalizing is any process used to produce such representations.

For describing such normalization, the following sentence will be used as an example:

When you are working with the HomeCenter you may need to use the buttons to do one or more tasks.

This example sentence may be normalized and represented through different levels of normalization which may result from one of the processes described in the following.

As a first normalization process applied to the example sentence morphological variance of individual words is normalized according to its base form. An example of normalizing a word to its base form is as follows.

"working" is normalized to "work",

"buttons" is normalized to "button".

In addition, a syntactic category preferably disambiguated, is assigned to each word. The syntactic category is determined based on a context analysis. The following examples may be assigned to individual words of the above example:

"use" is recognized as a "verb"

"HomeCenter" is recognized as a "proper noun"

"buttons" is recognized as a "plural noun"

Based on the above normalizing operations, particular linguistic units, so-called tags, are assigned to each word. Such "part-off-speech" tags may be +VB to indicate the syntactic category "verb". As an example, "use" would be tagged by +VB, "HomeCenter" would be tagged as +PN for a proper noun and "buttons" would be tagged by +NNS for being a plural noun.

TABLE 1

| Input form | Baseform | Part-of-Speech |
|---|---|---|
| When | When | +WRB |
| you | you | +PPSS |
| are | be | +BER |
| working | work | +VBG |
| with | with | +IN |
| the | the | +AT |
| HomeCentre | HomeCentre | +PN |
| you | you | +PPSS |
| may | may | +MD |
| need | need | +VB |
| to | to | +TO |
| use | use | +VB |
| the | the | +AT |
| buttons | button | +NNS |
| to | to | +TO |
| do | do | +DO |
| one | one | +CD |
| or | or | +CC |
| more | more | +AP |
| tasks | task | +NN |

Table 1 above shows the results of POS (part-of-speech) tagging with respect to the example sentence. With this normalized information, matching techniques between words may match words of text units regardless of the actual form of each word. Based on this approach, adverbials or adjectives may be ignored and matches between text sequences may be successful although both sequences may differ for particular string portions. Such a difference might be "use the buttons" and "use only the relevant button". Both strings would be matched based on the above-described approach.

Parsing is a further normalization operation. A parser extracts syntactic information indicating the configuration of a string into sub-strings (e.g. phrases or chunks) and relations between sub-structures.

Parsing the above given example sentence, may result in a normalized representation as follows:

The result indicates that the sub-string "when you are working with the HomeCenter" is recognized as a sub-clause. The sub-clause is introduced by "when". The beginning and end of the "when"-sub-clause is indicated by markers, e.g. "SC_WHEN". The infinitive clause is enclosed by markers "IV". The above example additionally shows some dependency relations which will be described in the following in detail.

A syntactic analysis may also provide explicit dependency relations between sub-strings extracted for selected pre-defined relations. As shown in the above syntactic information representing the first example sentence, "you" is indicated as being the subject of the verb "work". Further, the term "button" is indicated as being the object of the word "use". The expression "task" is indicated to be the object of the word "do". The expression "HomeCenter" is indicated to modify the verb "work". Such dependency relations may also be noted as follows:

SUBJ(you, work)
SUBJ(you, need)
OBJ(use, button)
OBJ(do, task)
VMODOBJ(work, with, Home Center)

Such relations may be used to find matches between common syntactic structures of sentences without regarding their actual surface realization. An example for a successful matching process for different sentences may be as follows:

(a) The parts must be replaced by a qualified technician.
(b) Only qualified technicians may replace the parts.

In both above example sentences "technician(s)" is the subject of the verb "replace"; the term "parts" is the object of the verb "replace".

For normalizing strings, e.g. sentence, also taxonomic and semantic links may be used. Such a semantic link may create from an individual word a connection to a super-ordinated term having a more general meaning, to a synonym word or even to another more specialized term for the same super-ordinated term. Such semantic links may exist between "jet plane" and "civil aircraft" or between "cattle", "breeder" and "farmer".

Semantic normalization relies on pre-existing language resources such as ontologies, thesauri, terminological data-bases and on semantic disambiguation processes. By employing operations for generating semantic links, the first example sentence described above might be annotated with the following semantic tags:

When you are working [WORK_PROCESS] with the HomeCenter [MACHINE] you may need to use the buttons [PARTS] do one or more tasks.

The above-described linguistic processes correspond to different levels of abstraction and provide information of increasing complexity. In addition, their representation scheme of the present invention makes use of another type of operation, named "skeletisation". Sekeletisation operates on the output of linguistic processes such as described above and provides another level of abstraction. More precisely, skeletisation replaces selected linguistic units by abstract variables.

As an example, skeletisation operating on the output of a shallow parser and abstracting over direct objects, proper names and technical terms, produces the following normalized representation for the first example sentence:

When you are working with <PROPER1>, you may need to use <OBJ1>to do <OBJ2>.

In the above example, the two direct objects "the buttons" and "one or more tasks" are replaced by the index variables OBJ1 and OBJ2. Further, the expression "HomeCenter" is replaced by the variable PROPER1.

Different skeletisation schemes may be used which are based on various linguistic parameters. As another example adverbial clauses may be abstracted. Such a clause is the "when-clause" in the first example sentence. Such a skeletisation process would result in the following representation of the sub-sentence:

<WHEN_CLAUSE> you may need to use the buttons to do one or more tasks.

In addition to the different possible kinds of skeletisation operations, it is possible to combine the operations into a complex one. Both above proposed skeletisation operations may be combined to produce the following representation:

<WHEN_CLAUSE> you may need to use <OBJ1> to do <OBJ2>.

A skeletisation may be more generally seen as a function Skel(x, Abstr, Filter(x)). In this function, "x" is a linguistic representation attached to an input string, "Abstr" is the set of linguistic units to be abstracted in "x" and how they should be represented in the output, and "Filter(x)" specifies how not-abstracted elements of x should be re-written (e.g., translation). By default, "Filter(x)" produces a sequence of not-abstracted surface forms as shown in the example representation of both skeletisation functions.

The above described skeletisation processes may be defined by such skeletisation functions. The first described skeletisation operation is directed to abstract over direct objects, proper names and technical terms. This skeletisation function may be described by function Skel(x, {OBJ,PN},). This function indicates that parts of a sentence marked by OBJ or PN must be abstracted, while the other elements of the sentence remain unchanged.

The second above described skeletisation process may be described by the following skeletisation function Skel(x, {WHEN_CLAUSE},). The finally described skeletisation procedure combining the first two may be described as Skel(x, {OBJ, PN, WHEN_CLAUSE},).

A linguistic unit to be abstracted may be specified in more detail in order to only abstract particular selected kinds of words. As an example, only female objects may be abstracted. Such a skeletisation function would have a parameter specifying the abstract parameter as OBJ&Fem. The parameter "Abstr" directly specifies the type of variable to replace the term in the sentence. Each such variable is indexed according to its position of occurrence in a string or sentence. Thus, the first direct object is marked by OBJ1 in order to uniquely identify this variable.

This skeletisation process highly depends on the linguistic representation in use. The examples above are only meant to illustrate the scope of invention. A plurality of different skeletisation functions is obvious for a person skilled in the art based on the above given examples.

When performing a plurality of normalization functions, each results in a different representation for the input sentence. The normalization procedures may also be combined in different ways. Each input sentence can be stored together with a set of representations provided by the employed normalization procedures. The first example sentence may be stored together with the following sequence of three representations:

1. Baseform and part-of-speech tagging:
When+WRB you+PPSS be+BER work+VBG with+IN the +AT Homecentre+NP you+PPSS may+MD need+VB to+TO use+VB the+AT button+NNS to+TO do+DO one+CD or+CC more+AP task+NNS.+SENT 2. Abstraction over When_clauses:

<WHEN_CLAUSE> you may need to use the buttons to do one or more tasks.

3. Abstraction over When_clauses and objects:

<WHEN_CLAUSE> you may need to use <OBJ1> to do <OBJ2>.

As already mentioned the given sentence may result in many different sequences of representations depending on the different linguistic processes and skeletisation functions used. In the following the selection of appropriate skeletisation functions or sequences of skeletisation functions will be described.

In the form of Skel(x, Abstr, Filter(x)), "Abstr" defines those elements within a string, namely a sentence x, which are to be abstracted, i.e. replaced by a variable. Elements to be replaced by variables may be lexical units, phrases, clauses, or any text element which should be abstracted.

In the following, the term "skeleton" will be used for the result of a skeletisation function.

Skeletons may be ranked depending on their degree of generalization. When assuming Skel1=Skel(x1, Abstr1, Filter(x)) and Skel2=Skel(x2, Abstr2, Filter(x)), then Skel1 is less general than Skel2. Those representations produced by Skel2 include elements to be replaced according to Skel1. An example for such a different generalization degree is shown by the following example wherein skeleton (a) is more general that skeleton (b) as (b) may be produced from (a):

(a) WHEN_CLAUSE you may need INF_CLAUSE1 INF_CLAUSE2

(b) WHEN_CLAUSE you may need to use NP1 to do NP2

Skeletisation functions may be ranked according to their degree of generalization based on the following ordering property. For any non empty sets "Abstr1" and "Abstr2" of elements to be abstracted, in case Abstr1Abstr2, then all skeletons obtained with Skel1 are less general than those skeletons obtained with Skel2. Then, the skeletisation function Skel1 is less general than the skeletisation Skel2.

Different schemes may be used to represent and select sequences of normalized representations efficiently. The following proposal for a representation in the form of a binary tree is a particular embodiment of the present invention. However, it is obvious to a person skilled in the art that a plurality of other representations may be possible based on the given examples.

When using the above ordering property, sequences of skeletisation functions may be represented using a binary tree. Each node of such a binary tree represents a skeletisation function. Each non-terminal node in the binary tree branches to two descendents, namely a left child and a right child. The left child represents the application of a non-empty skeletisation function, whereas its right child represents the identity function "idty". This identity function "idty" leaves the input unchanged. Thus, the identity function can be regarded as an empty skeletisation function (i.e. a skeletisation in which Abstr is empty).

A sequence of subsequently performed skeletisation functions is represented by a path within the binary tree. Such a path starts from the top of a tree and connects via a plurality of nodes (skeletisation operations) a terminal node.

An example will be given in connection with FIG. 5. Assuming that the following two sentences are subjected to sequences of skeletisation operations:

(1) When you are working with the HomeCenter you may need to use the buttons to do one or more tasks.

(2) When you are working with the HomeCenter you may need the manual to do one or more tasks.

The following elements are to be replaced by variables:
WHEN_CLAUSE
INF_CLAUSE (infinitive clause),
NP (non-plural)
VINF (verb, infinitive)

Figure 5:
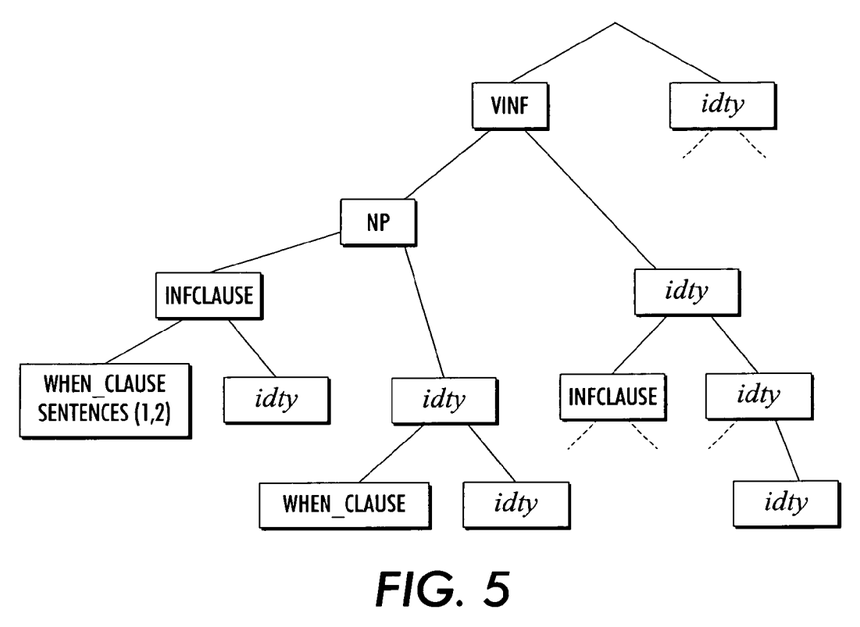
FIG. 5 is an example of a binary tree used to represent different skeletisation functions.

Based on the above listed skeletisation operations for the two example sentences, the binary tree of FIG. 5 may represent sequences of skeletisation functions. For sake of clarity, only a part of the tree is shown in FIG. 5.

As both sentences, namely sentence 1 and 2, may be abstracted using the whole set of above described skeletisation functions, they appear on the left most node of the tree. Such nodes may be marked in order to indicate that it is not possible to further abstract these representations based on a given set of sekeletisation functions.

For any given node N within the binary tree, those nodes which are located above or on the right of the given node N wherein the depth thereof is less than or equal to the one of N defines a set of nodes which are equivalent to N.

In a more particular embodiment, the set of text elements to be abstracted may be divided into two parts, the first part consisting of those elements which have to appear in the sentence in a precise order, and a second part consisting of those elements which may appear in any position within a sentence.

The above described binary tree representation is only one among others which may be derived from the described ordering property.

The selection of skeletons for sentences depends on the application for which the normalization procedure is intended. Skeletons relevant for translation memories may not be relevant for retrieval or for monolingual authoring. For retrieval applications, it is important that a retained skeletisation functions partitions efficiently the set of sentences, so that the search for similar sentences involves few steps. Thus, those skeletisation functions are to be selected, which discriminate best-input sentences and which stop skeletising sentences when the associated skeletisation function applies only to a few sentences. Similar considerations have to be carried out for other kinds of applications. A selection of operating functions, in particular skeletisation functions, and their order may be carried out by machine learning.

Referring now again FIG. 1, the configuration of an information retrieval system 101 further comprises a "search line" which comprises a query formatting unit 104 for formatting a query and generating a normalized representation for the query. In the formatting stage, the query is transformed by the unit 104 into a normalized representation, using the same methods 103 as described for text units. The results of retrieving operations performed by a matching unit 106 will be output as retrieved strings.

Figure 2:
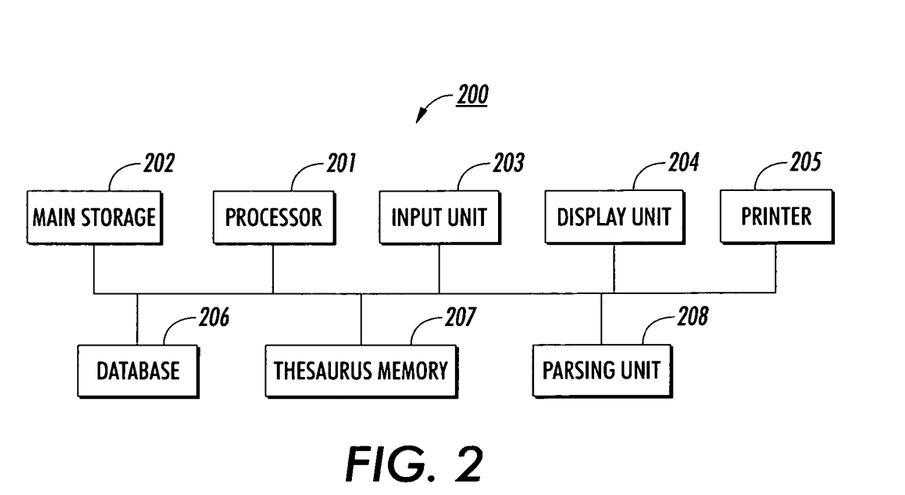
FIG. 2 illustrates a schematic diagram of a computer system.

As illustrated in FIG. 2, a computer system 200 according to the present invention comprises a processor 201 and a main storage 202 connected to the processor 201. The processor is further connected to an input unit 203 for inputting a data base query by a user. The results of the query are displayed on a display unit 204 or may be printed out via printer 205. The information is retrieved from a database 206 included in the computer system 200. The database may be provided on a hard disk of the computer system or on a particular storage media as CDs, DVDs or tape recording media. Alternatively, database 206 may be stored on a remote location connected to the computer system via a data transmission network. In a further alternative embodiment, database 206 may comprise texts stored in a plurality of computers connected in a network at high speed.

Processor 201 processing a query may also be used to process sentences. The processor 201 may further use a thesaurus memory 207. The thesaurus memory may provide semantic relations between terms or a plurality of terms. All those skilled in the art will appreciate, that the application of the method and apparatus according to the present invention is not limited to particular memories. All parts of the memories 206, 207, may be realized as a distinct area in a single memory. As those skilled in the art will further appreciate, the computer system 200 preferably comprises a main memory 202 for storing program code, such as operating and application programs 101,104, and 106 and data 102,103, and 105. It will also be appreciated by those skilled in the art that the processor 201 executes program code to process strings or queries. The computer 200 preferably comprises an external memory, such as a hard disk drive and floppy disk drive, for storing a problem code and data memory permanently.

Computer system 200 may further comprise a parsing unit 208 in order to extract syntactic relations between terms of a sentence. Alternatively, parsing unit 208 may be provided as an application program to be performed by processor 201.

Figure 3:
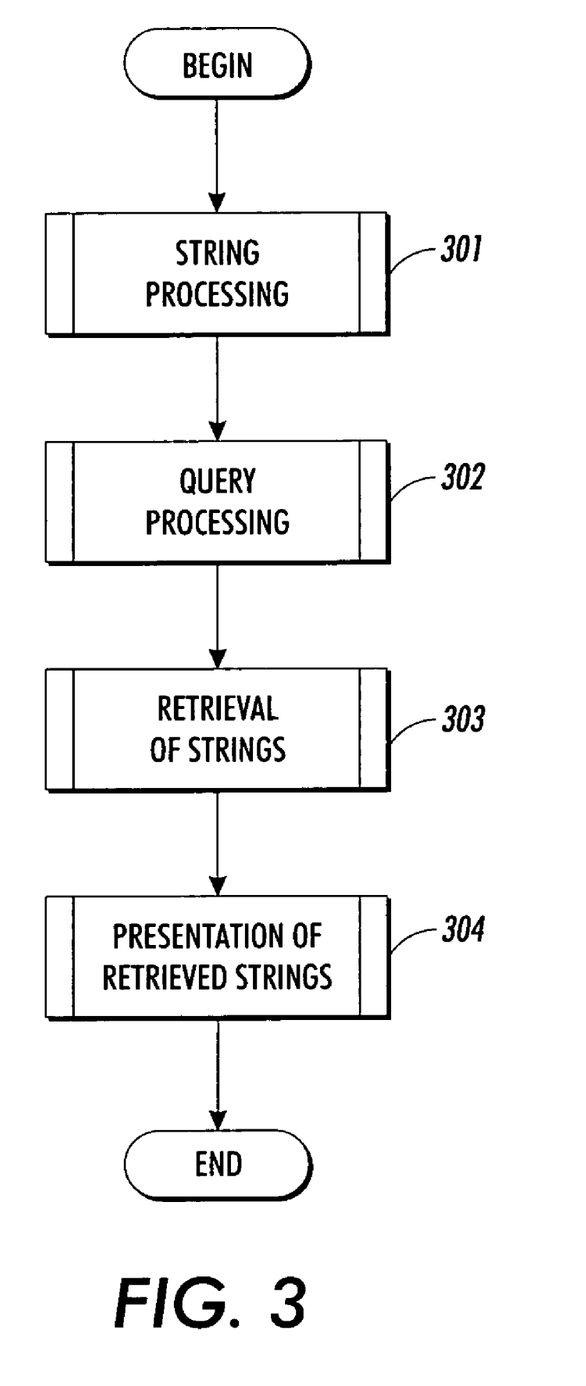
FIG. 3 is a flow-chart illustrating an information retrieval method.
Figure 4:
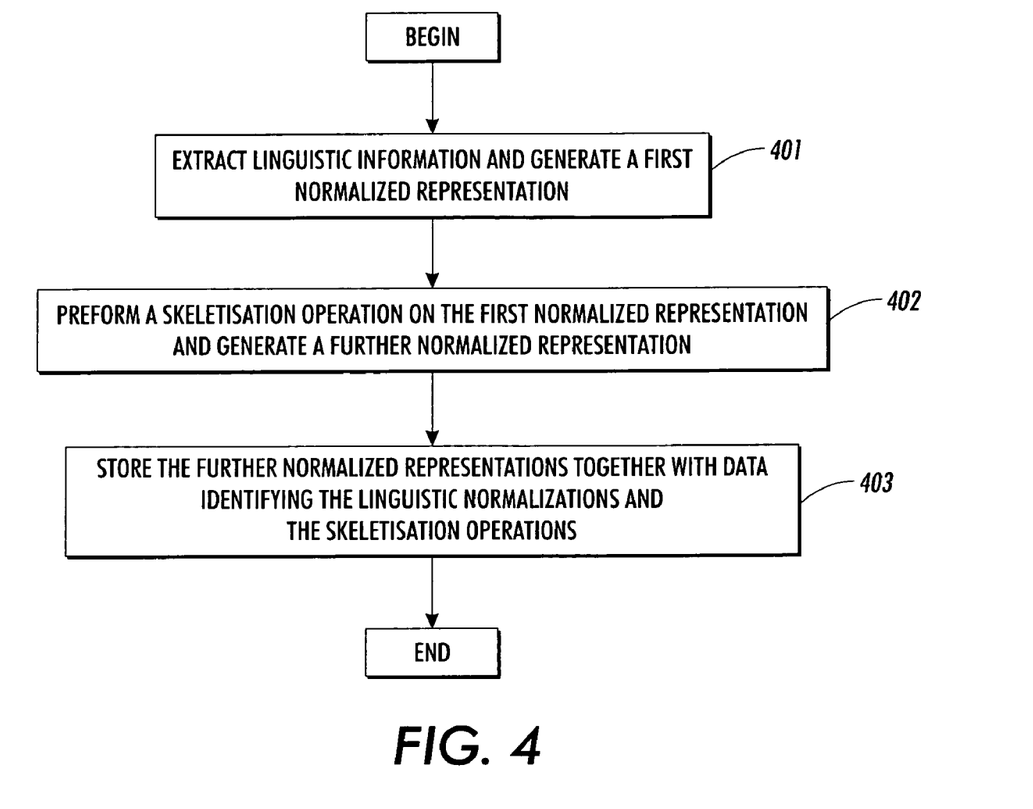
FIG. 4 is a flow-chart illustrating in more detail a text unit processing step of the process as depicted in FIG. 3.

A process of information retrieval will now be described in more detail with reference to the flow-chart diagrams as depicted in FIG. 3 and FIG. 4.

FIG. 3 illustrates general steps in an information retrieval system. First, in a string processing step 301 normalized representations are generated for all strings or text units in a database. Details of the string processing are given in FIG. 4.

In order to retrieve strings from a database, the user has to input a database query to find those strings relevant to the given input information. The received query is processed in the computer system 200 in step 302 in order to be in a format which may be compared to the stored data in the database.

For a retrieval, the query has to be compared with the stored data. The retrieval of strings in step 303 is based on the similarity of each string with respect to the database query. The retrieved information, which may include a translated version, is presented in step 304 to a user based on the relevance of each string with respect to the database query.

FIG. 4 illustrates in more detail the processing of strings, i.e. text units or sentences, for obtaining a database according to the present invention. The manner of knowledge representation, namely architecture of the database is an essential aspect of the present invention. All those skilled in the art will appreciate, that the particular knowledge representation and method of generating such knowledge representation is not restricted to a document retrieval application but may be a basis for knowledge extraction, translation information apparatus, etc.

First, in step 401 linguistic information is extracted from an input sentence as described above. Linguistic information includes morphological, syntactical, and semantic information and ways to disambiguate between. Based on the extracted information, a normalized representation is generated.

Such a normalizing procedure may be carried out with respect to different aspects a plurality of times. The performed sequence of operations will result in a corresponding plurality of normalized representations having a different degree of generalization.

Further, as indicated in step 402, a skeletisation operation is applied to the normalized representation(s). The skeletisation operations replace particular elements of a string or sentence by a variable in order to allow for better matches during an information retrieval process. Such variables will match to corresponding variables of other sentences regardless of the particular originally used text elements in text units or sentences to be matched.

The normalized representations resulting from the linguistic extracting step and the skeletisation step may each (or only selected ones) be stored together with the particular sentence, as for example strings 102.

Based on such databases, information retrieval and the provision of translation information may be improved based on an improved access to the relevant information stored.

It will be appreciated that portions of the system embodying the present invention may be readily implemented in software using software development environments that provide source code that can be used on a variety of hardware platforms. Alternatively, portions of the system may be implemented partially or fully in hardware using standard logic circuits. Whether software or hardware is used to implement different portions of the system varies depending on the speed and efficiency requirements of the system and also the particular function and the particular software or hardware systems and the particular microprocessor or microcomputer systems being utilized.

Also it will be appreciated by those skilled in the art that any resulting program(s) incorporating the present invention, having computer-readable program code, may be embodied within one or more computer-usable media such as memory devices or transmitting devices, thereby making a computer program product or article of manufacture. As such, the terms "article of manufacture" and "computer program product" as used herein are intended to encompass a computer program existent (permanently, temporarily, or transitorily) on any computer-usable medium such as on any memory device or in any transmitting device.

What is claimed is:

1. A method for normalizing input strings, the method comprising the steps of:
   (a) receiving the input strings;
   (b) linguistically analyzing the input strings to generate a first representation of each of the input strings; each of the first representations including linguistic information;
   (c) skeletising each of the first representations to generate a corresponding second representation for each of the input strings; said skeletising step replacing the linguistic information with abstract variables in each of the second representations; and
   (d) storing the second representation as normalized representations of the input strings.

2. The method of claim 1, wherein said step of linguistically analyzing comprises performing a plurality of operating functions.

3. The method of claim 2, wherein said plurality of operating functions comprise performing one of morphological analysis, syntactic analysis, and semantic analysis.

4. The method of claim 3, wherein said step of linguistically analyzing comprises normalizing words according to their base forms.

5. The method of claim 3, wherein said analysis further comprises the step of extracting a syntactic category for individual words.

6. The method of claim 3, wherein said analysis further comprises the step of extracting syntactic information representing string structure.

7. The method of claim 3, wherein said analysis further comprises the step of extracting dependency relations between sub-structures of a string.

8. The method of claim 3, wherein said analysis further comprises providing semantic links for individual words.

9. The method of claim 2, further comprising the step of performing machine learning for selecting particular operation functions out of said plurality of operating functions and for determining the processing order.

10. The method of claim 2, wherein said storing further comprises storing the operating functions performed on the normalized representations.

11. The method of claim 1, wherein the abstract variables are tags indicating the replaced linguistic information.

12. The method of claim 1, wherein the normalized representations are stored in a database.

13. The method of claim 12, further comprising: receiving a query; generating a normalized representation of said query by performing steps (b) and (c); matching the normalized representation of said query to the normalized representations stored in the database; and retrieving from said database strings identified by said matching step.

14. The method of claim 1, wherein said steps (a)–(d) are performed to generate a translation memory comprising a plurality of normalized representations of strings in a first language and a second language.

15. The method of claim 14, further comprising the steps of:

receiving an input string in the first language;

retrieving a similar string in said first language from said plurality of normalized representations, and outputting said translation information based on a string in said second language which corresponds to said retrieved string in said first language.

16. An apparatus for normalizing input strings, the apparatus comprising:

a text processing unit for: receiving the input strings, linguistically analyzing the input strings to generate a first representation of each of the input strings; each of the first representations including linguistic information, and skeletising each of the first representations to generate a corresponding second representation for each of the input strings; said skeletising replacing the linguistic information with abstract variables in each of the second representations; and memory for storing the second representation as normalized representations of the input strings.

17. The apparatus of claim 16, further comprising a query formatting unit for:

receiving queries;

linguistically analyzing the queries to generate a first representation of each of the queries; each of the first representations including linguistic information; and skeletising each of the first representations to generate a corresponding second representation for each of the queries; said skeletising replacing the linguistic information with abstract variables in each of the second representations.

18. The apparatus of claim 17, further comprising:

memory for storing the second representation of the queries as normalized representations of the queries;

a matching unit for matching the normalized representations of the input strings with the normalized representation of the queries.

19. The apparatus of claim 17, further comprising a translation memory for storing translations of the input strings.

* * * * *